(12) United States Patent
Wang

(10) Patent No.: US 9,894,161 B2
(45) Date of Patent: Feb. 13, 2018

(54) METHOD AND CPE FOR PROMOTING PORTAL WEBSITE BASED ON MAC ADDRESS

(71) Applicant: ZTE Corporation, Shenzhen (CN)

(72) Inventor: Zhaocheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 247 days.

(21) Appl. No.: 14/763,672

(22) PCT Filed: Aug. 21, 2013

(86) PCT No.: PCT/CN2013/081982
§ 371 (c)(1),
(2) Date: Jul. 27, 2015

(87) PCT Pub. No.: WO2014/114077
PCT Pub. Date: Jul. 31, 2014

(65) Prior Publication Data
US 2015/0358412 A1 Dec. 10, 2015

(30) Foreign Application Priority Data
Jan. 28, 2013 (CN) .......................... 2013 1 0032084

(51) Int. Cl.
*H04L 29/06* (2006.01)
*H04L 29/08* (2006.01)
*H04L 29/12* (2006.01)

(52) U.S. Cl.
CPC ........ *H04L 67/141* (2013.01); *H04L 61/2007* (2013.01); *H04L 63/0876* (2013.01);
(Continued)

(58) Field of Classification Search
CPC ................ G06F 17/3089; G06Q 20/12; G06Q 30/0214; G06Q 30/02; H04L 12/2872;
(Continued)

(56) References Cited

U.S. PATENT DOCUMENTS 8,423,631 B1 * 4/2013 Mower ............... H04L 12/6418
709/223
2006/0173977 A1 8/2006 Ho
(Continued)

FOREIGN PATENT DOCUMENTS

CN 1650655 A 8/2005
CN 101127782 A 2/2008
(Continued)

OTHER PUBLICATIONS

International Search Report for corresponding application PCT/CN2013/081982 filed Aug. 21, 2013 dated Nov. 28, 2013.
(Continued)

*Primary Examiner* — Le H Luu
(74) *Attorney, Agent, or Firm* — Cantor Colburn LLP

(57) ABSTRACT

A method and CPE for promoting a portal website base on an MAC address are provided. The method includes: after a WAN connection is established successfully, CPE query a pre-established address association table; when a corresponding MAC address terminal in the address association table is connected with the CPE, the CPE set a portal website redirection rule to the IP address of the corresponding MAC address terminal; and when the terminal accesses an external network, the CPE promote the portal website according to the set portal website redirection rule. The present invention can realize the promotion of a portal website at selectable intervals, and improve the promotion frequency and flexibility of the portal website.

18 Claims, 5 Drawing Sheets

(52) U.S. Cl.
CPC .............. *H04L 63/10* (2013.01); *H04L 67/02* (2013.01); *H04L 67/2838* (2013.01)

(58) Field of Classification Search
CPC ........... H04L 12/6418; H04L 29/12216; H04L 67/2838; H04L 67/141; H04L 67/02; H04L 63/10; H04L 63/0876; H04L 61/2007; H04M 3/42221; H04N 21/25808
See application file for complete search history.

(56) References Cited

U.S. PATENT DOCUMENTS

| | | | |
|---|---|---|---|
| 2007/0150603 A1* | 6/2007 | Crull | G06F 17/3089 709/227 |
| 2010/0082780 A1* | 4/2010 | Muilenburg | G06F 17/3089 709/221 |
| 2010/0174607 A1* | 7/2010 | Henkin | G06Q 30/02 705/14.53 |
| 2011/0066479 A1* | 3/2011 | Benson | G06Q 20/12 705/14.4 |
| 2011/0106947 A1* | 5/2011 | Lin | H04L 29/12216 709/225 |
| 2011/0145379 A1* | 6/2011 | Kilfoyle | H04L 12/2872 709/222 |
| 2011/0191811 A1* | 8/2011 | Rouse | H04N 21/25808 725/93 |
| 2011/0196725 A1* | 8/2011 | Malcolmson | G06Q 30/0214 705/14.16 |
| 2011/0287748 A1* | 11/2011 | Angel | H04M 3/42221 455/414.1 |
| 2012/0303812 A1 | 11/2012 | Short et al. | |
| 2015/0358412 A1* | 12/2015 | Wang | H04L 67/2838 709/220 |

FOREIGN PATENT DOCUMENTS

| | | |
|---|---|---|
| CN | 101163000 A | 4/2008 |
| CN | 101437048 A | 5/2009 |
| CN | 102647716 A | 8/2012 |
| WO | 0131886 A2 | 5/2001 |

OTHER PUBLICATIONS

Supplementary European Search Report for corresponding application EP13872756 dated Apr. 22, 2016; pp. 9.

* cited by examiner

METHOD AND CPE FOR PROMOTING PORTAL WEBSITE BASED ON MAC ADDRESS

TECHNICAL FIELD

The present invention relates to the technical field of communications, and in particular to a method for promoting a portal website based on a MAC (Media Access Control), and CPE (Customer Premise Equipment).

BACKGROUND ART

In the process where a user accesses the Internet, operators often hope that their portal websites can be promoted to the user for relevant information publicity. At present, with the rapid development of the communication industry and the intensification of competition, such portal website promotion method can improve the competitiveness and corporate image of the operators in some sense.

At present, there are a few operator portal website promotion methods as follows: one is to accomplish via address translation on a local end device BAS, and such method usually requires a user to log on an account on an operator portal website, and then the user can enjoy Internet services properly after logging on; and the other is to accomplish via an access server, and such method enables a user to be forced to convert a web page when the user accesses the Internet for the first time into an operator portal website web page after PPPoE dialing is successful, thereby achieving the effect of operator portal website promotion.

However, these portal website promotion methods merely enable a user to redirect to an operator portal website when accessing the Internet for the first time. If the user's machine is on-line all along, then operator portal website promotion for the second time will be unable to be carried out on the user or a series of users corresponding to the IP. With the development of the telecommunication industry, it is commonly seen that one family has two or more terminals and Internet access devices (such as mobile phones). Therefore, these families may generally choose a CPE home gateway as their Internet access device. In addition, with regard to the CPE home gateway, a user is accustomed to not powering off and not disconnecting from the network, i.e. the case where the user is on-line all along as mentioned above. Moreover, with the popularization of the Internet, such case will become more and more, while accordingly, the number of times that an operator portal website is presented is lower and lower.

In addition, the CPE home gateway per se has DHCP (Dynamic Host Configuration Protocol) and NAT (Network Address Translation) services, and in the portal website promotion method above, portal website promotion is performed based on an IP address to a great extent; therefore, in practical use processes, it will be discovered that among numerous terminals or other devices which access the Internet using one CPE home gateway, only the device which accesses the Internet at first may have the chance to have an operator portal website presented thereon, while after this, when other terminals or devices access the Internet again, the operator may not have the chance to present its portal website.

Therefore, in CPE devices, a method for regular portal website promotion using MAC addresses to distinguish devices with selectable intervals has become necessary.

CONTENT OF THE INVENTION

The present invention provides a CPE and method for promoting a portal website based on the MAC address, and is intended to improve the promotion frequency and flexibility of the portal website.

According to one aspect of the present invention, an embodiment of a method for promoting a portal website based on the MAC address is provided, and the method includes:

after a WAN connection is established successfully, CPE queries a pre-established address association table;

when a corresponding MAC address terminal in the address association table is connected with the CPE, the CPE sets a portal website redirection rule to the IP address of the corresponding MAC address terminal; and when the terminal accesses an external network, the CPE promotes the portal website according to the set portal website redirection rule.

Preferably, before the step of after a WAN connection is established successfully, CPE queries a pre-established address association table, the method further includes:

after having detected that there is a terminal accessing at a LAN side, the CPE establishes an address association table where the IP address of the terminal corresponds to the MAC address.

Preferably, after the step of promoting the portal website according to the set portal website redirection rule, the method further includes:

The CPE deletes the portal website redirection rule corresponding to the IP address;

The MAC address corresponding to the IP address has been taken as a reference, the CPE starts a timer;

when the timer expires, according to corresponding MAC address information in the timer, the CPE searches for the terminal corresponding to the MAC address to check whether it is still connected with the CPE; if so, then the CPE queries the address association table again to acquire an IP address corresponding to the MAC address, and starts the redirection rule again with regard to the IP address; otherwise the CPE deletes relevant information about a table entry corresponding to the MAC address in the address association table.

Preferably, after the step of when the terminal accesses an external network, the CPE promotes the portal website according to the set portal website redirection rule, the method further includes:

The CPE updates the address association table according to an access situation of the terminal.

Preferably, after the step of updating the address association table, the method further includes:

the CPE detects whether there is a WAN connection currently, and if so, then judges whether an IP address corresponding to the current MAC address updates or not;

if the IP address corresponding to the current MAC address has not updated, then the CPE establishes a portal website redirection rule with regard to the IP address; and if the IP address corresponding to the current MAC address has updated, then the CPE judges whether a timer has started with regard to a previous IP address; if the timer has started, then the CPE not carries out any operation; and if the timer has not started, then the CPE deletes a portal website redirection rule corresponding to the previous IP address.

Preferably, the method further includes:

after having detected that the terminal has disconnected, the CPE searches for the IP address corresponding to the terminal to check whether a timer of a portal website redirection rule has started; if so, then waits for the timer to expire and then carries out a corresponding operation; otherwise the CPE deletes the portal website redirection rule corresponding to the IP address of the terminal and relevant information in the address association table.

Preferably, before the step of after a WAN connection is established successfully, CPE queries a pre-established address association table, the method further includes:

the CPE regularly enables a portal website promotion function.

Preferably, after the step of when the terminal accesses an external network, the CPE promotes the portal website according to the set portal website redirection rule, the method further includes:

the CPE disables the portal website promotion function.

According to another aspect of the present invention, an embodiment of a CPE for promoting a portal website based on MAC address is proposed, the CPE includes:

a query module is configured to, after a WAN connection is established successfully, query a pre-established address association table;

a setting module is configured to, when a corresponding MAC address terminal in the address association table is connected with the CPE, set a portal website redirection rule to the IP address of the corresponding MAC address terminal; and a promotion processing module is configured to, when the terminal accesses an external network, promote the portal website according to the set portal website redirection rule.

Preferably, the CPE further includes:

an establishment module configured to, after having detected that there is a terminal accessing at a LAN side, establish an address association table where the IP address of the terminal corresponds to the MAC address.

Preferably, the promotion processing module is further configured to, after promoting the portal website, delete the portal website redirection rule corresponding to the IP address; take the MAC address corresponding to the IP address as a reference, start a timer; when the timer expires, according to corresponding MAC address information in the timer, search for the terminal corresponding to the MAC address to check whether it is still connected with the CPE; if so, then the query module query the address association table again to acquire an IP address corresponding to the MAC address, and start the redirection rule again with regard to the IP address; otherwise delete relevant information about a table entry corresponding to the MAC address in the address association table.

Preferably, the establishment module is further configured to update the address association table according to an access situation of the terminal.

Preferably, the promotion processing module is further configured to detect whether there is a WAN connection currently, and if so, then judge whether an IP address corresponding to the current MAC address updates or not; if the IP address corresponding to the current MAC address has not updated, then establish a portal website redirection rule with regard to the IP address; and if the IP address corresponding to the current MAC address has updated, then judge whether a timer has started with regard to a previous IP address; if the timer has started, then the CPE not carry out any operation; and if the timer has not started, then the CPE delete a portal website redirection rule corresponding to the previous IP address.

Preferably, the promotion processing module is further configured to, after having detected that the terminal has disconnected, search for the IP address corresponding to the terminal to check whether a timer of a portal website redirection rule has started; if so, then wait for the timer to expire and then carrying out a corresponding operation; otherwise delete the portal website redirection rule corresponding to the IP address of the terminal and relevant information in the address association table.

Preferably, the CPE further includes:

a configuration module is configured to regularly enable a portal website promotion function, or disable the portal website promotion function.

In the embodiments of the method and the CPE for portal website promotion based on MAC address, according to the situation of an accessed terminal, an address association table where the IP address of the terminal is associated to the MAC address is established; after a WAN connection is established successfully, the CPE queries the address association table; when a corresponding MAC address terminal in the address association table is connected with the CPE, the CPE sets a portal website redirection rule to the IP address of the corresponding MAC address terminal; and when the terminal accesses an external network, the CPE promotes the portal website according to the set portal website redirection rule, then the CPE may regularly start the redirection rule for the terminal connected with the CPE via a timer, thereby realizing the promotion of the portal website at selectable intervals, improving the promotion frequency and flexibility of the portal website.

DETAILED DESCRIPTION OF THE EMBODIMENTS

The main idea of the solution of the embodiments of the present invention is: according to the situation of an accessed terminal, an address association table where the IP address of the terminal is associated to the MAC address is established; after a WAN connection is established successfully, the CPE queries the address association table; when a corresponding MAC address terminal in the address association table is connected with the CPE, the CPE sets a portal website redirection rule to the IP address of the corresponding MAC address terminal; and when the terminal accesses an external network, the CPE promotes the portal website according to the set portal website redirection rule, then it may regularly start the redirection rule for the terminal connected with the CPE via a timer, thereby realizing the promotion of the portal website at selectable intervals, improving the promotion frequency and flexibility of the portal website.

Figure 1:
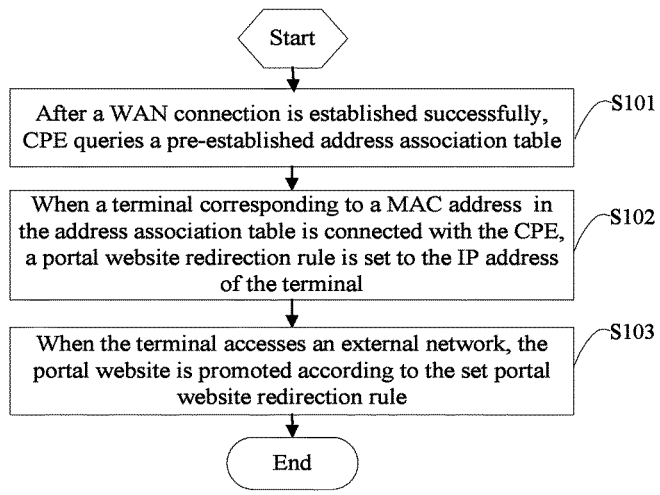
FIG. 1 is a flow schematic diagram of an embodiment of an MAC address-based portal website promotion method on CPE of the present invention.

As shown in FIG. 1, an MAC address-based portal website promotion method on CPE proposed in an embodiment of the present invention includes:

step S101, after a WAN connection is established successfully, CPE queries a pre-established address association table.

After the CPE starts, an address association table where the MAC address of an access terminal at an LAN side associates with the IP address is established for recording the MAC address of the access terminal and IP address-relevant information corresponding thereto. Once a new terminal accesses, a table entry is newly established in the address association table. If the IP address of a certain terminal at the LAN side changes, then IP information corresponding to the corresponding MAC address is updated in the address association table, thereby taking the MAC as a reference.

After the WAN connection is established successfully in the CPE, the CPE queries all the table entries in the address association table above and checks if the corresponding MAC address terminal in each table entry is connected with the CPE.

Step S102, when a corresponding MAC address terminal in the address association table is connected with the CPE, a portal website redirection rule is set to the IP address of the corresponding MAC address terminal; and step S103, when the terminal accesses an external network, the portal website is promoted according to the set portal website redirection rule.

By querying if a corresponding MAC address terminal in each table entry in the address association table is connected with the CPE, a portal website redirection rule is set to the IP address corresponding to the still connected MAC address. The portal website redirection rule is used for redirecting an address when the terminal access an external network of the Internet, and modifying the terminal access address into the address of an operator promotion website.

Specifically, when a certain terminal accesses an external Internet web page, and when a GET request packet accessed thereby passes the CPE, the CPE may match a rule thereof to check whether a portal website redirection rule exists. Once the redirection rule exists, a request destination address of the GET request packet is modified into the address of an operator promotion website, thereby archiving the purpose of operator portal website promotion.

Then, the CPE may automatically delete the redirection rule corresponding to the IP address, and at the same time, take the MAC address corresponding to the IP address as a reference to start a timer. When the timer expires, the CPE may search, according to corresponding MAC address information in the timer, for the terminal corresponding to the MAC address to check whether it is still connected with the CPE. If the terminal corresponding to the MAC is still connected with the CPE, then the CPE may query the address association table between the MAC address and the IP address again, so as to acquire an IP address corresponding to the MAC address, and start the redirection rule again for the IP address; otherwise, delete relevant information about a corresponding table entry of the MAC address in the address association table.

At any moment after the CPE starts, when a terminal disconnects from the CPE, the CPE may search for the IP corresponding to the terminal to check whether a timer of the portal website redirection rule has started. If the timer has not started, it means that the redirection rule of the IP address still exists. At this moment, the CPE may delete the redirection rule corresponding to the IP address thereof and relevant information in the address association table. If the timer has started, then any operation will not be carried out, and an operation will be carried out after waiting for the timer to expire, because the terminal may access the CPE again in this process.

The present embodiment realizes portal website promotion at selectable intervals, and improves the promotion frequency and flexibility of the portal website by means of the solution above.

Figure 2:
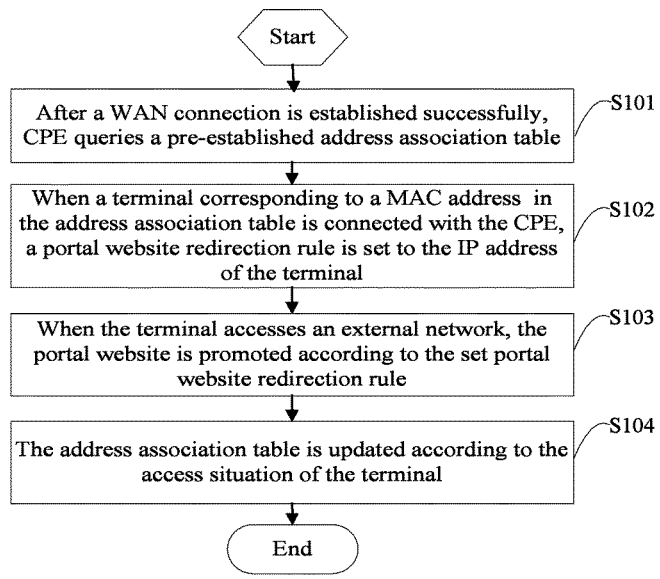
FIG. 2 is a flow schematic diagram of another embodiment of an MAC address-based portal website promotion method on CPE of the present invention.

As shown in FIG. 2, an MAC address-based portal website promotion method on CPE proposed in another embodiment of the present invention further includes, after step S103 above and on the basis of the embodiment shown in FIG. 1 above:

step S104, the address association table is updated according to an access situation of the terminal.

After the CPE starts, at any moment the terminal accesses the CPE, the CPE may firstly check whether a node corresponding to the MAC address exists in the address association table. If not, then a node is newly established and linked to the tail of the linked list of the address association table. If the MAC address exists, then whether the IP address corresponding to the MAC address changes is checked, and if so, then the IP address corresponding to the MAC address of the node is updated into the current IP address.

After the linked list information is updated, the CPE may check whether there is an Internet WAN connection currently. If there is no WAN connection, then it continues to wait for the establishment of the WAN connection, while if the WAN connection has already existed currently, then firstly it is judged whether the IP corresponding to the MAC address currently is an updated IP address. If the IP address has not changed, then a portal website redirection rule is directly established for the IP address, otherwise further judgement also needs to be performed.

If the IP corresponding to the MAC currently is changed IP, then it means that there is old IP corresponding to the MAC existing in the CPE. At this moment, the CPE judges for this old IP whether a regular portal website promotion timer set above has started. If the timer has started, then the CPE does not perform any operation, while if the timer has not started, then the CPE may delete the portal website redirection rule corresponding to the old IP.

The present embodiment realizes the portal website promotion at selectable intervals, and further improves the promotion frequency and flexibility of the portal website by means of the solution above.

Figure 3:
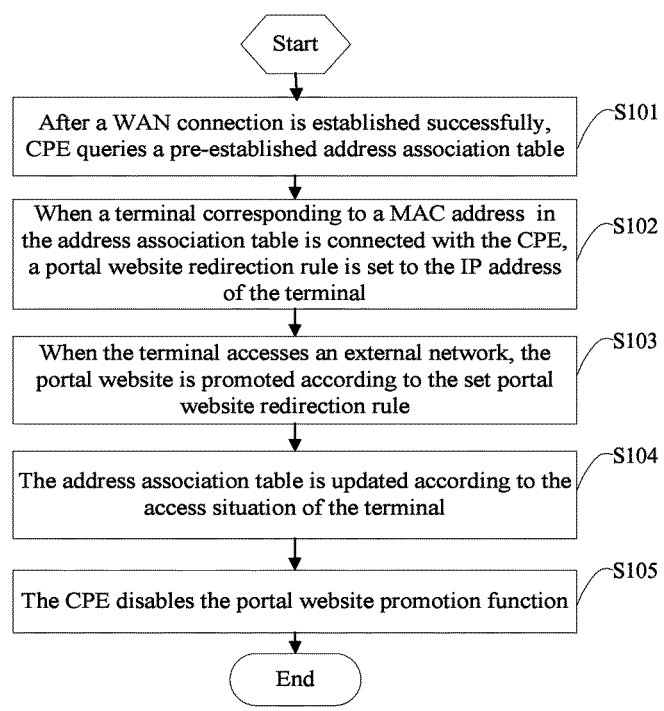
FIG. 3 is a flow schematic diagram of still another embodiment of an MAC address-based portal website promotion method on CPE of the present invention.

As shown in FIG. 3, an MAC address-based portal website promotion method on CPE proposed in still another embodiment of the present invention further includes, after step S101 above and on the basis of the embodiment shown in FIG. 1 above:

step S100, the CPE regularly enables a portal website promotion function.

After step S103 above, the method further includes:

step S105, the CPE disables the portal website promotion function.

Compared with the embodiment above, the present invention may design a configuration page according to an operator's requirement so as to facilitate the operator to perform different configurations according to different users. When the operator disables the promotion function from the configuration page, the CPE may delete all the currently existing IP redirection rules so as to achieve the purpose of cancelling the portal website promotion function. When the operator enables the promotion function again from the configuration page, the CPE sets redirection rules for the IP of all the connected devices, so as to achieve the purpose of re-enabling the portal website promotion function.

The terminal in the embodiment above may be a PC or a mobile terminal, etc.

Figure 4:
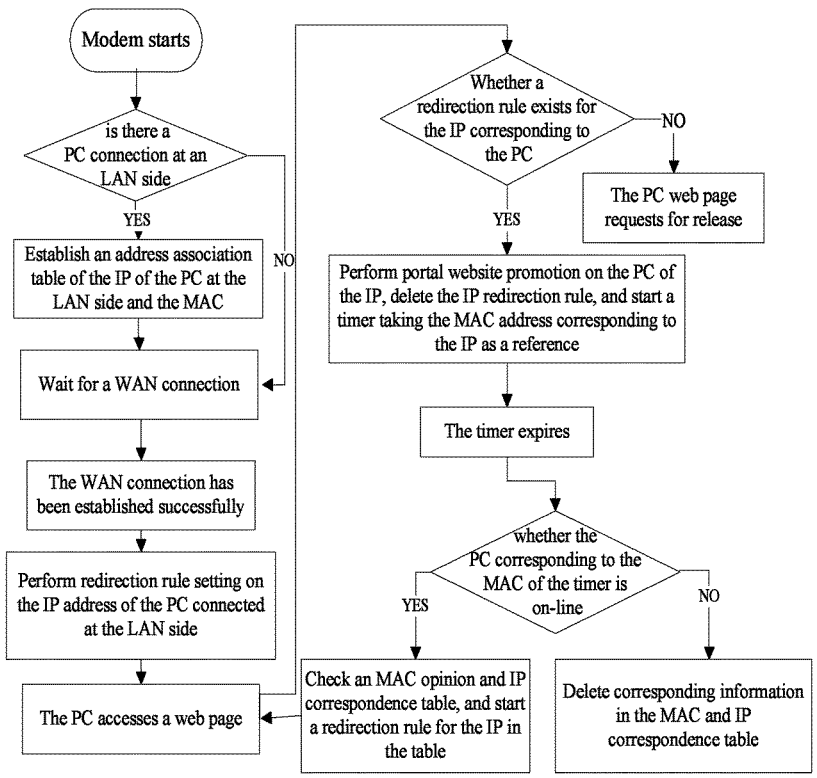
FIG. 4 is a principle schematic diagram of ADSL modem regular portal website promotion in the embodiments of the present invention.

The PC machine is taken as an example below in conjunction with FIG. 4 to elaborate the solution of the embodiments of the present invention in detail:

step 1, when a CPE system starts, the header of a linked list gPortalUrlList of a structural table where an IP address corresponds to an MAC address is created and is correspondingly initialized.

Step 2, after initialization is finished, the CPE detects a PC connected therewith at a LAN side, and once the corresponding PC is detected, inserts the MAC address of the PC and a corresponding structure T_FW_PORTALURL established by the IP address into the linked list created in step 1. If there is no PC machine already connected therewith, then any operation will not be performed.

Step 3, after a WAN connection of the CPE is established successfully, a bottom layer driver sends a relevant EV_WANLAN_UP message to the timing portal module. The module will start scanning from the header of the linked list gPortUrlList, and perform portal website redirection setting on on-line IP addresses in the T_FW_PORTALURL structure stored in nodes in each linked list, wherein the operation will enable the PC of the IP to redirect to a portal website of an operator when accessing an Internet web page.

Step 4, when the user PC machine accesses the Internet web page for the first time, a portal website redirection function in the CPE may be triggered, and the Internet web page request will be redirected to the portal website of the operator. When the portal website redirection is accomplished, the functional module reports to the CPE that its redirection has been successful. At this moment, the CPE may delete the portal website redirection rule corresponding to the IP address of the PC. In the meantime, a timer TIMER_N is allocated to the MAC address corresponding to the IP, and the timer TIMER_N is started.

Step 5, when the timer reaches a trigger point time, the timer may be automatically triggered to process a function fwPUrlTimerMsg. The function searches for the MAC address corresponding to the timer currently, and checks whether the MAC address is still on-line (the PC is connected with the CPE). If it is on-line, then the portal website redirection rule is started with the IP address corresponding to the MAC, thus reaching a circulation of regular portal website promotion; and if the MAC address has been off-line at this moment (the PC is disconnected from the CPE), then relevant information about a table entry corresponding to the MAC in the gPortalUrlList linked list is deleted.

Step 6, After the CPE system starts, at any moment the PC machine accesses the CPE, the CPE may firstly check whether a node corresponding to the MAC address exists in the gPortUrlList linked list. If not, then a node is newly established and linked to the tail of the linked list gPortUrlList. If the MAC address exists, then whether the IP address corresponding to the MAC address changes is checked, and if so, then the IP corresponding to the MAC address of the node is updated into the current IP address.

Step 7, after the linked list information is updated, the CPE may check whether there is an Internet WAN connection currently. If there is no WAN connection, then it continues to wait for the establishment of the WAN connection, while if the WAN connection has already existed currently, then firstly it is judged whether the IP corresponding to the MAC address currently is an updated IP address. If the IP address has not changed, then a portal website redirection rule is directly established for the IP, otherwise further judgement also needs to be performed.

Step 8, if the IP corresponding to the MAC currently is changed IP, then it also means that there is old IP corresponding to the MAC existing in the CPE. At this moment, the CPE judges for this old IP whether a regular portal website promotion timer set in step 4 has started. If the timer has started, then the CPE does not perform any operation, while if the timer has not started, then the CPE may delete the portal website redirection rule corresponding to the old IP.

Step 9, after the CPE starts, at any moment the PC disconnects from the CPE, the CPE may judge whether the regular portal website promotion timer set in step 4 has been started for the MAC address. If the timer has not started, then the portal website redirection rule corresponding to the IP currently corresponding to the MAC is deleted; otherwise, if the timer has started, a table entry corresponding to the MAC in the gPortalUrlList linked list is deleted.

Figure 5:
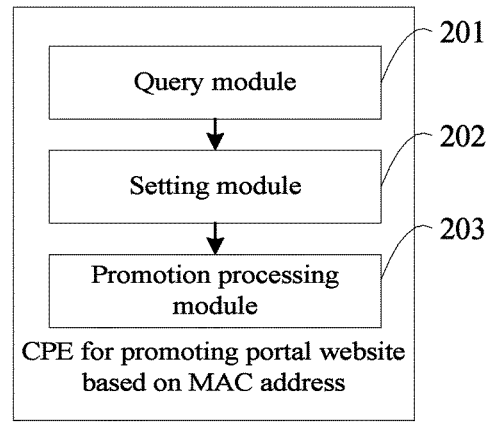
FIG. 5 is a structural schematic diagram of an embodiment of MAC address-based portal website promotion CPE of the present invention.

As shown in FIG. 5, MAC address-based portal website promotion CPE proposed in an embodiment of the present invention includes: a query module 201, a setting module 202 and a promotion processing module 203, wherein the query module 201 is configured to, after a WAN connection is established successfully, query a pre-established address association table;

the setting module 202 is configured to, when a corresponding MAC address terminal in the address association table is connected with the CPE, set a portal website redirection rule to the IP address of the corresponding MAC address terminal; and the promotion processing module 203 is configured to, when the terminal accesses an external network, promote the portal website according to the set portal website redirection rule.

After the CPE starts, an address association table where the MAC address of an access terminal at an LAN side associates with the IP address is established for recording the MAC address of the access terminal and IP address-relevant information corresponding thereto. Once a new terminal accesses, a table entry is newly established in the address association table. If the IP address of a certain terminal at the LAN side changes, then IP information corresponding to the corresponding MAC address is updated in the address association table, thereby taking the MAC as a reference.

After the WAN connection is established successfully in the CPE, the query module 201 of the CPE queries all the table entries in the address association table above and checks if the corresponding MAC address terminal in each table entry is connected with the CPE.

By querying if a corresponding MAC address terminal in each table entry in the address association table is connected with the CPE, the setting module 202 sets a portal website redirection rule to the IP address corresponding to the still connected MAC address. The portal website redirection rule is used for redirecting an address when the terminal access an external network of the Internet, and modifying the terminal access address into the address of an operator promotion website.

Specifically, when a certain terminal accesses an external Internet web page, and when a GET request packet accessed thereby passes the CPE, the promotion processing module 203 of the CPE may match a rule thereof to check whether a portal website redirection rule exists. Once the redirection rule exists, a request destination address of the GET request packet is modified into the address of an operator promotion website, thereby archiving the purpose of operator portal website promotion.

Then, the CPE may automatically delete the redirection rule corresponding to the IP address, and at the same time, take the MAC address corresponding to the IP address as a reference to start a timer. When the timer expires, the CPE may search, according to corresponding MAC address information in the timer, for the terminal corresponding to the MAC address to check whether it is still connected with the CPE. If the terminal corresponding to the MAC is still connected with the CPE, then the CPE may query the address association table between the MAC address and the IP address again, so as to acquire an IP address corresponding to the MAC address, and start the redirection rule again for the IP address; otherwise, delete relevant information about a corresponding table entry of the MAC address in the address association table.

In addition, at any moment after the CPE starts, when a terminal disconnects from the CPE, the CPE may search for the IP corresponding to the terminal to check whether a timer of the portal website redirection rule has started. If the timer has not started, it means that the redirection rule of the IP address still exists. At this moment, the CPE may delete the redirection rule corresponding to the IP address thereof and relevant information in the address association table. If the timer has started, then any operation will not be carried out, and an operation will be carried out after waiting for the timer to expire, because the terminal may access the CPE again in this process.

The present embodiment realizes the promotion of the portal website at selectable intervals, and improves the promotion frequency and flexibility of the portal website by means of the solution above.

Figure 6:
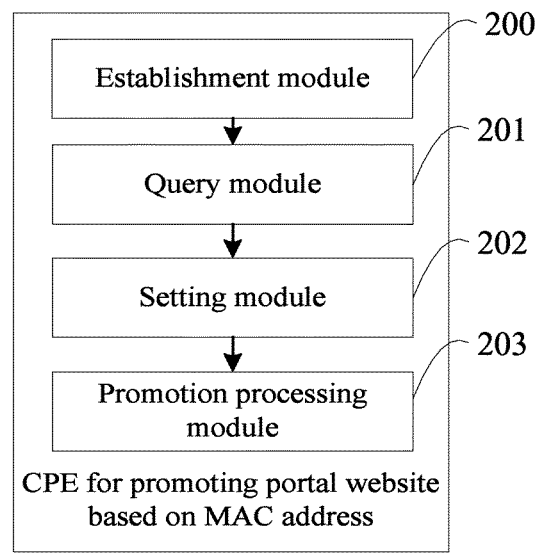
FIG. 6 is a structural schematic diagram of another embodiment of MAC address-based portal website promotion CPE of the present invention.

As shown in FIG. 6, MAC address-based portal website promotion CPE proposed in another embodiment of the present invention further includes, on the basis of the embodiment above:

an establishment module 200 configured to, after having detected that there is a terminal accessing at a LAN side, establish an address association table where the IP address of the terminal corresponds to the MAC address, and update the address association table according to an access situation of the terminal.

The present embodiment differs from the embodiment above in that the present embodiment further includes the solution of establishing an address association table where the IP address of the terminal corresponds to the MAC address and updating the address association table.

Specifically, after the CPE starts, the establishment module 200 establishes an address association table where the MAC address of an access terminal at an LAN side associates with the IP address for recording the MAC address of the access terminal and IP address-relevant information corresponding thereto. Once a new terminal accesses, a table entry is newly established in the address association table. If the IP address of a certain terminal at the LAN side changes, then IP information corresponding to the corresponding MAC address is updated in the address association table, thereby taking the MAC as a reference.

After the CPE starts, at any moment the terminal accesses the CPE, the CPE may firstly check whether a node corresponding to the MAC address exists in the address association table. If not, then a node is newly established and linked to the tail of the linked list of the address association table. If the MAC address exists, then whether the IP address corresponding to the MAC address changes is checked, and if so, then the IP address corresponding to the MAC address of the node is updated into the current IP address.

After the linked list information is updated, the CPE may check whether there is an Internet WAN connection currently. If there is no WAN connection, then it continues to wait for the establishment of the WAN connection, while if the WAN connection has already existed currently, then firstly it is judged whether the IP corresponding to the MAC address currently is an updated IP address. If the IP address has not changed, then a portal website redirection rule is directly established for the IP address, otherwise further judgement also needs to be performed.

If the IP corresponding to the MAC currently is changed IP, then it means that there is old IP corresponding to the MAC existing in the CPE. At this moment, the CPE judges for this old IP whether a regular portal website promotion timer set above has started. If the timer has started, then the CPE does not perform any operation, while if the timer has not started, then the CPE may delete the portal website redirection rule corresponding to the old IP.

The present embodiment realizes promoting a portal website at selectable intervals, further improving the promotion frequency and flexibility of the portal website by means of the solution above.

Figure 7:
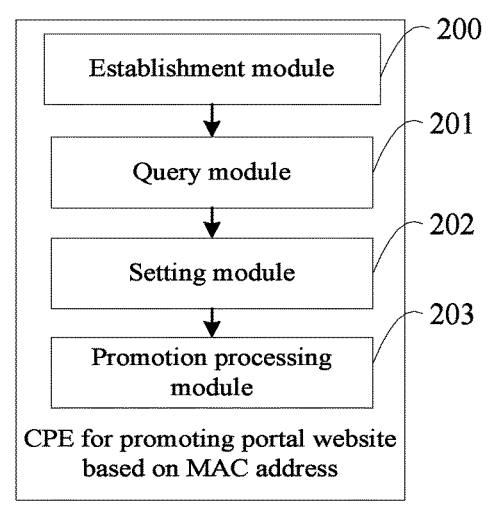
FIG. 7 is a structural schematic diagram of still another embodiment of MAC address-based portal website promotion CPE of the present invention.

As shown in FIG. 7, MAC address-based portal website promotion CPE proposed in still another embodiment of the present invention, on the basis of the embodiment shown in FIG. 5 above, the CPE further includes:

a configuration module 204 is configured to regularly enable a portal website promotion function, or disable the portal website promotion function.

Compared with the embodiment above, the present invention may design a configuration page according to an operator's requirement so as to facilitate the operator to perform different configurations according to different users. When the operator disables the promotion function from the configuration page, the CPE may delete all the currently existing IP redirection rules so as to achieve the purpose of cancelling the portal website promotion function. When the operator enables the promotion function again from the configuration page, the CPE sets redirection rules for the IP of all the connected devices, so as to achieve the purpose of re-enabling the portal website promotion function.

The terminal in the embodiment above may be a PC or a mobile terminal, etc.

The MAC address-based portal website promotion method on CPE, and CPE in the embodiments of the present invention establish, according to the situation of an accessed terminal, an address association table where the IP address of the terminal corresponds to the MAC address; after a WAN connection is established successfully, query the address association table; when a corresponding MAC address terminal in the address association table is connected with the CPE, set a portal website redirection rule to the IP address of the corresponding MAC address terminal; and when the terminal accesses an external network, present the portal website according to the set portal website redirection rule, then may regularly start the redirection rule for the terminal connected with the CPE via a timer, thereby realizing the promotion of the portal website at selectable intervals, and improves the promotion frequency and flexibility of the portal website.

The above is only the preferred embodiments of the present invention and is not intended to limit the present invention. Any replacements of the equivalent structure or flow based on the contents of the specification and drawings of the present invention, or the applications of the equivalent replacements, directly or indirectly, used in other related technical fields shall fall within the scope of protection of the disclosure.

What is claimed is:

1. A method for promoting a portal website based on a MAC address, which applies on a CPE, the method comprises:
    after a WAN connection is established successfully, CPE querying a pre-established address association table;
    when a terminal corresponding to a MAC address in the address association table is connected with the CPE, setting a portal website redirection rule to an IP address of the terminal; and
    when the terminal accesses an external network, promoting the portal website according to the set portal website redirection rule.

2. The method according to claim 1, wherein before the step of after a WAN connection is established successfully, CPE querying a pre-established address association table, the method further comprises:
    after having detected that there is a terminal accessing at a LAN side, the CPE establishing the address association table where the IP address of the terminal corresponds to the MAC address.

3. The method according to claim 2, wherein after the step of when the terminal accesses an external network, promoting the portal website according to the set portal website redirection rule, the method further comprises:
    updating the address association table according to an access situation of the terminal.

4. The method according to claim 1, wherein after the step of promoting the portal website according to the set portal website redirection rule, the method further comprises:
    deleting the portal website redirection rule corresponding to the IP address;
    taking the MAC address corresponding to the IP address as a reference, starting a timer;
    when the timer expires, according to corresponding MAC address information in the timer, searching for the terminal corresponding to the MAC address to check whether it is still connected with the CPE; if so, then
    the CPE querying the address association table again to acquire an IP address corresponding to the MAC address, and starting the redirection rule again with regard to the IP address; otherwise
    deleting relevant information in a table entry corresponding to the MAC address in the address association table.

5. The method according to claim 4, wherein after the step of when the terminal accesses an external network, promoting the portal website according to the set portal website redirection rule, the method further comprises:
    updating the address association table according to an access situation of the terminal.

6. The method according to claim 1, wherein after the step of when the terminal accesses an external network, promoting the portal website according to the set portal website redirection rule, the method further comprises:
    updating the address association table according to an access situation of the terminal.

7. The method according to claim 6, wherein after the step of updating the address association table, the method further comprises:
    the CPE detecting whether there is a WAN connection currently, and if so, then judging whether the IP address corresponding to the current MAC address has been updated or not;
    if the IP address corresponding to the current MAC address has not updated, then establishing a portal website redirection rule with regard to the IP address; and
    if the IP address corresponding to the current MAC address has updated, then judging whether a timer has started with regard to a previous IP address; if the timer has started, then the CPE not carrying out any operation; and if the timer has not started, then the CPE deleting a portal website redirection rule corresponding to the previous IP address.

8. The method of claim 6, wherein the method further comprises:
    after having detected that the terminal has disconnected, the CPE searching for the IP address corresponding to the terminal to check whether a timer of a portal website redirection rule has started; if so, then waiting for the timer to expire and then carrying out a corresponding operation; otherwise
    deleting the portal website redirection rule corresponding to the IP address of the terminal and relevant information in the address association table.

9. The method according to claim 1, wherein before the step of after a WAN connection is established successfully, CPE querying a pre-established address association table, the method further comprises:
    the CPE regularly enabling a portal website promotion function.

10. The method according to claim 9, wherein after the step of when the terminal accesses an external network, promoting the portal website according to the set portal website redirection rule, the method further comprises:
    the CPE disabling the portal website promotion function.

11. A CPE for promoting a portal website based on a MAC address, comprising:
    a query module configured to, after a WAN connection is established successfully, query a pre-established address association table;
    a setting module configured to, when a terminal corresponding to a MAC address in the address association table is connected with the CPE, set a portal website redirection rule to an IP address of the terminal; and
    a promotion processing module configured to, when the terminal accesses an external network, promote the portal website according to the set portal website redirection rule.

12. The CPE according to claim 11, wherein the CPE further comprises:
    an establishment module configured to, after having detected that there is a terminal accessing at a LAN side, establish an address association table where the IP address of the terminal corresponds to the MAC address.

13. The CPE according to claim 12, wherein the promotion processing module is further configured to, after promoting the portal website, delete the portal website redirection rule corresponding to the IP address; take the MAC address corresponding to the IP address as a reference, start a timer; when the timer expires, according to corresponding MAC address information in the timer, search for the terminal corresponding to the MAC address to check whether it is still connected with the CPE; if so, then the query module query the address association table again to acquire an IP address corresponding to the MAC address, and start the redirection rule again with regard to the IP address; otherwise delete relevant information in a table entry corresponding to the MAC address in the address association table.

14. The CPE according to claim 13, wherein the establishment module is further configured to update the address association table according to an access situation of the terminal.

15. The CPE according to claim 12, wherein the establishment module is further configured to update the address association table according to an access situation of the terminal.

16. The CPE according to claim 15, wherein the promotion processing module is further configured to detect whether there is a WAN connection currently, and if so, then judge whether an IP address corresponding to the current MAC address updates or not; if the IP address corresponding to the current MAC address has not updated, then establish a portal website redirection rule with regard to the IP address; and if the IP address corresponding to the current MAC address has updated, then judge whether a timer has started with regard to a previous IP address; if the timer has started, then the CPE not carry out any operation; and if the timer has not started, then the CPE delete a portal website redirection rule corresponding to the previous IP address.

17. The CPE according to claim 15, wherein the promotion processing module is further configured to, after having detected that the terminal has disconnected, search for the IP address corresponding to the terminal to check whether a timer of a portal website redirection rule has started; if so, then wait for the timer to expire and then carry out a corresponding operation; otherwise delete the portal website redirection rule corresponding to the IP address of the terminal and relevant information in the address association table.

18. The CPE according to claim 15, wherein the CPE further comprises:
    a configuration module configured to regularly enable a portal website promotion function, or disabled the portal website promotion function.

* * * * *